(12) United States Patent
Demers et al.

(10) Patent No.: US 7,162,689 B2
(45) Date of Patent: Jan. 9, 2007

(54) SCHEMA EVOLUTION IN REPLICATION

(75) Inventors: Alan J. Demers, Boulder Creek, CA (US); Curtis Elsbernd, Belmont, CA (US); James William Stamos, Saratoga, CA (US); Lik Wong, Union City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 09/321,594

(22) Filed: May 28, 1999

(65) Prior Publication Data

US 2002/0174142 A1    Nov. 21, 2002

Related U.S. Application Data

(60) Provisional application No. 60/086,985, filed on May 28, 1998.

(51) Int. Cl.
*G06F 17/00* (2006.01)

(52) U.S. Cl. .................. 715/511; 715/509; 707/203

(58) Field of Classification Search .............. 707/503, 707/509, 903, 904, 101, 104.1, 201, 203, 707/202, 204; 709/204; 434/350; 715/203, 715/509, 903, 904, 503, 511
See application file for complete search history.

(56) References Cited

U.S. PATENT DOCUMENTS

| | | | | |
|---|---|---|---|---|
| 4,631,673 A | | 12/1986 | Haas et al. | 707/100 |
| 5,220,657 A | * | 6/1993 | Bly et al. | 345/751 |
| 5,261,102 A | | 11/1993 | Hoffman | 713/200 |
| 5,333,316 A | * | 7/1994 | Champagne et al. | 707/8 |
| 5,379,423 A | | 1/1995 | Mutoh et al. | 707/204 |
| 5,418,966 A | | 5/1995 | Madduri | 710/200 |
| 5,440,735 A | * | 8/1995 | Goldring | 707/8 |
| 5,452,448 A | | 9/1995 | Sakuraba et al. | 707/201 |
| 5,459,860 A | | 10/1995 | Burnett et al. | 707/101 |
| 5,540,735 A | | 7/1996 | Wingrove | 607/46 |
| 5,553,279 A | | 9/1996 | Goldring | 707/201 |
| 5,577,211 A | | 11/1996 | Annapareddy et al. | 707/232 |
| 5,603,024 A | | 2/1997 | Goldring | 707/203 |
| 5,613,079 A | * | 3/1997 | Debique et al. | 711/141 |
| 5,613,113 A | | 3/1997 | Goldring | 707/202 |
| 5,664,173 A | | 9/1997 | Fast | 707/4 |
| 5,684,945 A | | 11/1997 | Chen et al. | 714/20 |
| 5,706,509 A | | 1/1998 | Man-Hak Tso | 707/201 |
| 5,729,730 A | * | 3/1998 | Wlaschin et al. | 707/3 |
| 5,729,734 A | | 3/1998 | Parker et al. | 707/9 |
| 5,737,601 A | | 4/1998 | Jain et al. | 707/201 |
| 5,761,493 A | | 6/1998 | Blakeley et al. | 707/4 |
| 5,765,165 A | | 6/1998 | Harper | 707/200 |
| 5,771,669 A | | 6/1998 | Langworthy et al. | 56/6 |
| 5,787,427 A | | 7/1998 | Benantar et al. | 707/9 |
| 5,794,030 A | | 8/1998 | Morsi et al. | 707/103 R |
| 5,799,306 A | | 8/1998 | Sun et al. | 707/10 |

(Continued)

*Primary Examiner*—Sanjiv Shah
(74) *Attorney, Agent, or Firm*—Hickman Palermo Truong & Becker LLP; Christopher J. Brokaw

(57) ABSTRACT

Schema evolution involves defining flavored object groups. Specifically, related collections of replicated tables and other database objects, which are defined as belonging to an object group, are given different "flavors." A flavor describes different subsets of the objects and even different subsets of the columns in the master tables. In one embodiment, when one site in a distributed database system propagates changes to a replicated database object, the current flavor for the site is also transmitted, so that the destination site can make the necessary adjustments in the uploaded changes by dropping the values for obsolete columns and using default values for new columns.

22 Claims, 7 Drawing Sheets

U.S. PATENT DOCUMENTS

| | | | |
|---|---|---|---|
| 5,806,074 A | 9/1998 | Souder et al. | 707/201 |
| 5,806,075 A | 9/1998 | Jain et al. | 707/201 |
| 5,819,263 A | 10/1998 | Bromley et al. | 707/3 |
| 5,832,275 A | 11/1998 | Olds | 717/173 |
| 5,870,759 A | 2/1999 | Bauer et al. | 707/201 |
| 5,870,765 A | 2/1999 | Bauer et al. | 707/203 |
| 5,884,325 A | 3/1999 | Bauer et al. | 707/201 |
| 5,926,816 A | 7/1999 | Bauer et al. | 707/8 |
| 5,963,959 A | 10/1999 | Sun et al. | 707/200 |
| 5,974,429 A * | 10/1999 | Strub et al. | 707/203 |
| 5,995,980 A | 11/1999 | Olson et al. | 707/201 |
| 5,999,936 A | 12/1999 | Pattison et al. | 707/101 |
| 5,999,947 A * | 12/1999 | Zollinger et al. | 707/203 |
| 6,003,067 A * | 12/1999 | Suzuki et al. | 345/753 |
| 6,006,232 A | 12/1999 | Lyons | 707/101 |
| 6,006,239 A * | 12/1999 | Bhansali et al. | 707/104.1 |
| 6,016,497 A * | 1/2000 | Suver | 707/103 R |
| 6,144,974 A * | 11/2000 | Gartland | 707/517 |
| 6,151,602 A | 11/2000 | Hejlsberg et al. | 707/10 |
| 6,205,418 B1 | 3/2001 | Li et al. | 704/18 |
| 6,272,502 B1 | 8/2001 | Lieuwen et al. | 707/203 |
| 6,289,335 B1 | 9/2001 | Downing et al. | 707/3 |
| 6,292,811 B1 * | 9/2001 | Clancey et al. | 715/503 |
| 6,314,439 B1 | 11/2001 | Bates et al. | 715/513 |
| 6,321,236 B1 * | 11/2001 | Zollinger et al. | 707/203 |
| 6,330,568 B1 * | 12/2001 | Boothby et al. | 707/201 |
| 6,366,933 B1 | 4/2002 | Ball et al. | 715/511 |
| 6,405,218 B1 * | 6/2002 | Boothby | 707/201 |
| 6,484,159 B1 * | 11/2002 | Mumick et al. | 707/2 |
| 2003/0009431 A1 | 1/2003 | Souder et al. | |

* cited by examiner

SCHEMA EVOLUTION IN REPLICATION

RELATED APPLICATIONS

The present application claims the benefit of U.S. Provisional Application No. 60/086,985 entitled "Replication for Front Office Replication" filed on May 28, 1998 by Benny Souder, Alan Downing, Harry Sun, Alan Demers, James Stamos, John Graham, and Curtis Elsbernd, the contents of which are hereby incorporated by reference herein.

The present application is related to the following commonly-assigned U.S. patent applications, the contents of all of which in their entirety are hereby incorporated by reference herein:

U.S. application Ser. No. 09/322,153 entitled "Data Replication for Front Office Automation" filed on May 28, 1999 by Benny Souder, Alan Downing, Harry Sun, Alan Demers, James Stamos, John C. Graham, Curtis Elsbernd, Mahesh Subramaniam, and Wayne E. Smith;

U.S. application Ser. No. 09/321,622 entitled "Lightweight Data Replication" filed on May 28, 1999 by Sukanya Balaraman, Alan Downing, John C. Graham, Lewis S. Kaplan, Benny Souder, and Harry Sun;

U.S. application Ser. No. 09/321,624 entitled "Data Replication Security" filed on same date herewith by Wayne E. Smith and Alan Downing;

U.S. application Ser. No. 09/321,625 entitled "Method and Software for Mass Deployment of Front Office Applications" filed on May 28, 1999 by Curtis Elsbernd, Benny Souder, and Wayne E. Smith; and U.S. application Ser. No. 09/321,594 entitled "Schema Evolution in Replication" filed on May 28, 1999 by Alan Demers, Curtis Elsbernd, James Stamos, and Lik Wong.

FIELD OF THE INVENTION

The present invention relates to distributed database systems and more particularly to schema evolution and column-level subsetting of database objects.

BACKGROUND OF THE INVENTION

Applications evolve over time. Changes are made to support new features, and old features are dropped. Changes to a database application usually require changing database objects. For example, tables are changed by adding or dropping columns. Indexes are added to support faster or different queries. Views are modified to support changes in the table shape, and even whole tables may be added or dropped. "Schema evolution" refers to the changes that occur to an application's database objects over time.

Replication complicates schema evolution, because copies of the database objects are stored on multiple sites in a distributed network of database systems. Before any of the administrative operations in schema evolution are performed at one site for a particular database object, any activities requiring replication for that database object must be suspended, or "quiesced," at all sites. Quiescence allows all previously made replication activities to complete, so that all replicated modifications may be performed consistently with respect to the administrative environment at each site. Thus, replication is quiesced at all sites to prevent inconsistent modifications to replicated data. One implementation of quiescence is described in the commonly assigned U.S. Pat. No. 5,991,768 entitled "Finer Grained Quiescence for Data Replication" issued Nov. 23, 1999 to Harry Sun et al., the contents of which are incorporated by reference as if fully set forth herein.

In large-scale distributed database systems with many master sites, quiescence of every master site at the same time is often awkward or impractical. For example, changing a replicated table requires quiescing all of the masters that are replicating the table, changing the table, regenerating replication support for the table, and resuming replication of the table. For configurations that support many master sites, or have masters in different time zones, this approach may not be practical.

Practical support for schema evolution is much more difficult when the distributed database system includes disconnected sites, such as laptop computers in front office automation. Recently, there has been much interest in the marketplace for applications for front office automation. One example is sales force automation, where hundreds, if not thousands, of sales representatives in a company are given laptops to improve their productivity. The laptops are loaded with applications and a data store, for example, to keep the customer and order information handy for use by a specific sales representative for selling the company's products to a customer and taking the customer's order.

Thus, in front office automation deployments, there may be hundreds or even thousands of client databases. These databases, however, are not connected for very long periods of time, and it is exceedingly rare that that all of them are connected at the same time. Consequently, quiescence for such deployments is an extremely difficult, if not impossible, administrative task to perform.

SUMMARY OF THE INVENTION

There is a need for an implementation of schema evolution that is suitable in a large-scale distributed system such as front office automation environment without incurring the above-described and other disadvantages. This and other needs are addressed by the present invention by allowing replication to occur even though certain administrative changes have been applied to database objects at only some of the sites.

One aspect of the invention, relating to schema evolution, involves defining flavored object groups. Specifically, related collections of replicated tables and other database objects can be defined as belonging to an object group, which is given different "flavors." A flavor describes different subsets of the objects and even different subsets of the columns in the master tables. For example, when one site in a distributed database system propagates changes to a replicated database object, the current flavor for the site is also transmitted with the changes, so that the destination site can make the necessary adjustments in the uploaded changes by dropping the values for obsolete columns and using default values for new columns.

Another aspect of the invention relates to vertical partitioning. Vertical partitioning refers to replication between two copies of a table or other database object, in which one of the copies only has a subset of the columns of the full table. Thus, vertical partitioning or "column-level subsetting" is a special case of schema evolution, since copy of the table may have added or dropped columns while these schema changes have not yet been applied to the other copy and perhaps may never be applied.

For example, one embodiment of this aspect involves to a method of propagating changes to a table. In accordance with the method, a first copy of the table is maintained at a first site, and a second copy of the table is maintained at a second site, in which the first copy of the table and the second copy of the table have at least one non-overlapping column. Thus, changes to the first copy of the table are transmitted from the first site to the second site, and the second copy of the table is updated at the second site based on the transmitted changes.

Still other objects and advantages of the present invention will become readily apparent from the following detailed description, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENTS

A method, article, and apparatus for column-level subsetting and schema evolution are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In a database management system, data is stored in one or more data containers, each container contains records, and the data within each record is organized into one or more fields. In relational database systems, the data containers are referred to as tables, the records are referred to as rows, and the fields are referred to as columns. In object oriented databases, the data containers are referred to as object classes, the records are referred to as objects, and the fields are referred to as attributes. Other database architectures may use other terminology.

Systems that implement the present invention are not limited to any particular type of data container or database architecture. However, for the purpose of explanation, the terminology and examples used herein shall be that typically associated with relational databases. Thus, the terms "table," "row," and "column" shall be used herein to refer respectively to the data container, record, and field.

HARDWARE OVERVIEW

Figure 1:
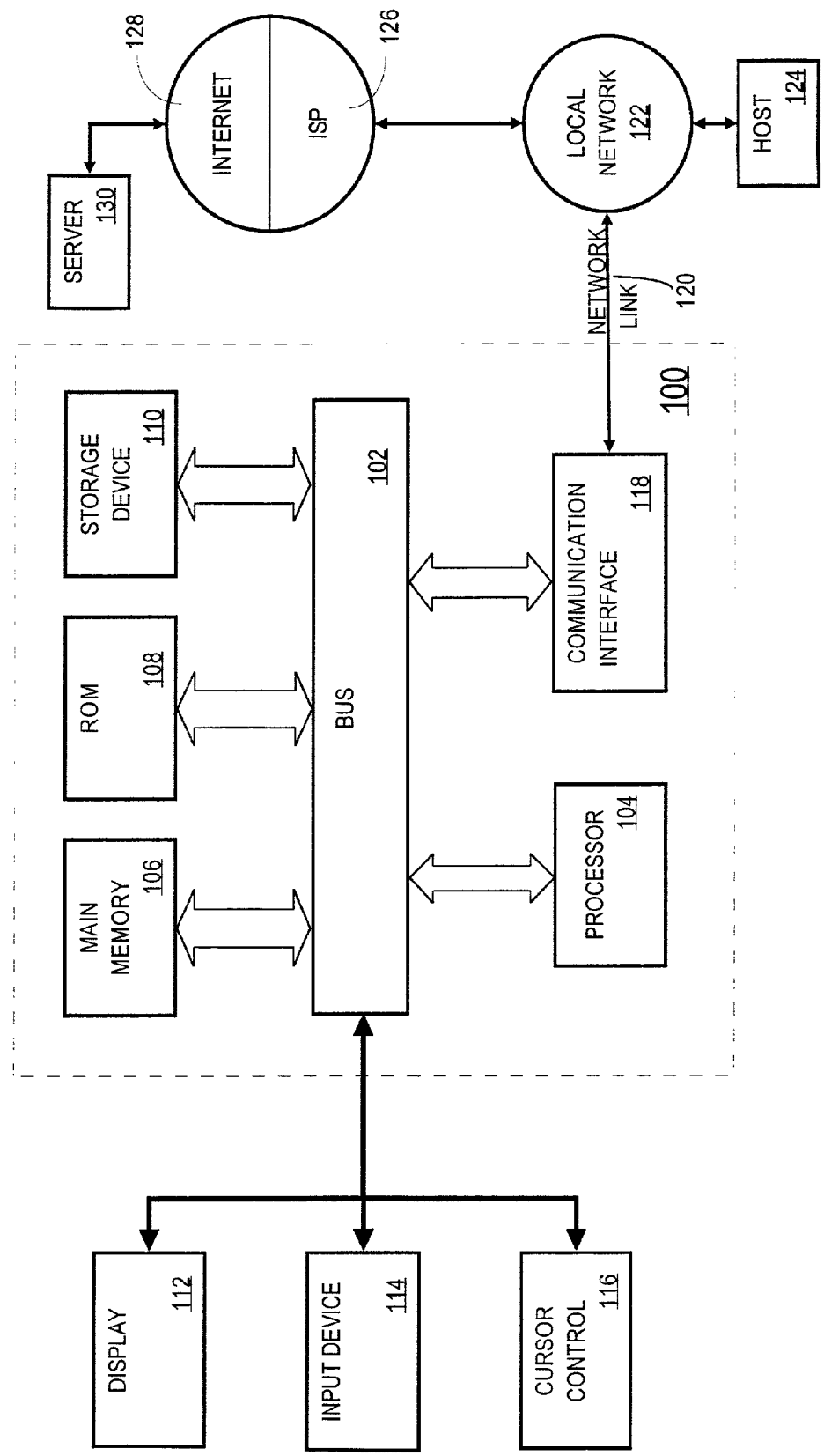
FIG. 1 depicts a computer system on which an embodiment of the present invention can be implemented.

FIG. 1 is a block diagram that illustrates a computer system 100 upon which an embodiment of the invention may be implemented. Computer system 100 includes a bus 102 or other communication mechanism for communicating information, and a processor 104 coupled with bus 102 for processing information. Computer system 100 also includes a main memory 106, such as a random access memory (RAM) or other dynamic storage device, coupled to bus 102 for storing information and instructions to be executed by processor 104. Main memory 106 may also be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

The invention is related to the use of computer system 100 for column-level subsetting and schema evolution. According to one embodiment of the invention, column-level subsetting and schema evolution are provided by computer system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. One or more processors in a multi-processing arrangement may also be employed to execute the sequences of instructions contained in main memory 106. In alternative embodiments, hardwired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media include, for example, optical or magnetic disks, such as storage device 110. Volatile media include dynamic memory, such as main memory 106. Transmission media include coaxial cables, copper wire and fiber optics, including the wires that comprise bus 102. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be borne on a magnetic disk of a remote computer. The remote computer can load the instructions into its dynamic memory and send the instructions over a telephone line using a modem. A modem local to computer system 100 can receive the data on the telephone line and use an infrared transmitter to convert the data to an infrared signal. An infrared detector coupled to bus 102 can receive the data carried in the infrared signal and place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the worldwide packet data communication network, now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120, and communication interface 118. In the Internet example, a server 130 might transmit a requested code for an application program through Internet 128, ISP 126, local network 122 and communication interface 118. In accordance with the invention, one such downloaded application provides for column-level subsetting and schema evolution as described herein.

The received code may be executed by processor 104 as it is received, and/or stored in storage device 110, or other non-volatile storage for later execution. In this manner, computer system 100 may obtain application code in the form of a carrier wave.

FLAVORED OBJECT GROUPS

An object group is a set of metadata that maps objects to logical groups. Object groups enable related objects to be grouped according to their logical relationship. Thus, when one member of an object is group modified, changes are propagated to all the sites at which the object group is replicated. For example, one object in an object group may refer to data in another object. By placing both these objects in the same object group, the database system can ensure that both objects are replicated to each site. Accordingly, object groups promote consistent replication because changes to one object of an object group are propagated along with changes to other objects in the object group. Object groups within the context of master-to-master replication are described in more detail in the commonly assigned U.S. Pat. No. 5,799,306 entitled "Method and apparatus for facilitating data replication using object groups" issued Aug. 25, 1998 to Harry Sun et al., whose entire contents are hereby incorporated by reference herein.

A flavor of an object group is metadata that specifies a subset of the objects in the objects group and a subset of the columns of each table or index in the object group, including all primary key columns. Thus, two sites instantiated with different flavors of an object group may hold different subsets of the objects in the object group, and the tables they hold in common may have different sets of columns.

Figure 2:
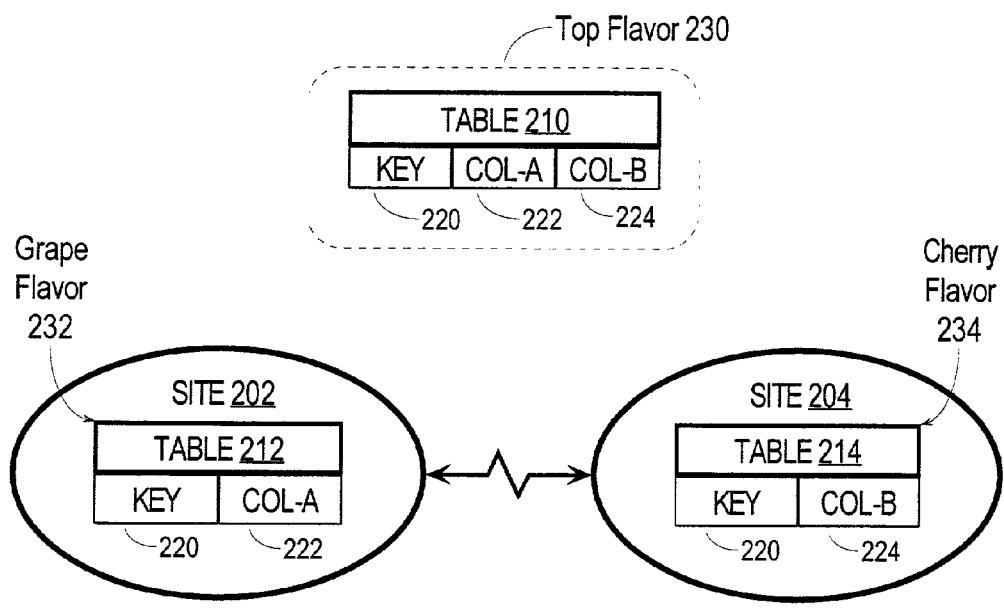
FIG. 2 depicts a distributed database system with a flavored object group.

For example, FIG. 2 illustrates a distributed database system with two sites, site 202 and site 204, in which respective tables 212 and 214 belong to a grape flavored 232 object group and a cherry flavored 234 object group, respectively. The grape flavored 232 table 212 at site 202 has two columns, a primary key 220 and column A 222. By contrast, the cherry flavored 234 table 214 at site 204 has two columns, the same primary key 220 but column B 224. Both the grape flavor 232 and the cherry flavor 234 are related because they both describe subsets of a top flavor 230. The top flavor 230 describes an object group with a table 210 that has the same primary key 220 but both column A 222 and column B 224. As used herein, the "top flavor" 230 refers to the full object group, which includes every object in the object group and every column for every object in the object group.

Other flavors may also be defined to describe subsets of the top flavor 230. For example, one flavor could describe an object group with fewer tables, indexes, or other objects than the object group described by the top flavor. As another example, a flavor could describe an index in the flavored object group being built on a subset of the table column of a corresponding index in the top flavor. Generally, however, the sites must agree on the types of identically named columns, the choice of primary key columns, the column group relation, and on the conflict resolution procedures.

Flavors of an object group may be created implicitly or explicitly. Implicit flavor creation occurs when an object is added to the object group, when an object is removed from the object group, and when the shape of a replicated table in the object group is altered (as by adding or dropping columns). These changes affect the top flavor. Explicit flavor creation occurs by cloning an existing flavors and modifying the clone or by creating a flavor from scratch and defining its contents.

In a preferred embodiment, a new flavor is published before it can be instantiated. Publication of a flavor definition informs every other master site of the existence and definition of the new flavor. As a result, master sites are able to handle different flavors during replication. Furthermore, the definition of the flavor is preferably performed a designated site, referred to as the "master definition" site, which is instantiated at the top flavor at all times. The new flavor definition is published from the master definition site to avoid synchronization issues that could arise if database administrators at two different sites tried to define and publish inconsistent new flavors concurrently.

REPLICATION WITH FLAVORS

When different sites 202 and 204 are instantiated with different flavors 232 and 234, respectively, the tables 212 and 214 they hold in common may have different sets of columns. As illustrated in FIG. 2, table 212 at site 202 has column A 222 and table 214 at site 204 has column B 224, neither column is found at the other site. Accordingly, replication must be able to handle updates, inserts, and deletes occurring at one site 202 that is propagated to another site 204, when the sites 202, 204 instantiate different flavors.

In one embodiment, the source site at which changes were made propagates the updates, inserts, and deletes using the shape of the table and other database object in the flavor of the source site. For example, if site 202 is to propagate changes to table 212, then the changes are propagated for using the shape of table 212, i.e. with the primary key 220 and column A 222. The source site 202 also supplies the flavor of the propagated changes along with the propagated changes to avoid having to inform every other master site 204 beforehand of the current flavor 232 of the source site 202.

Figure 3A:
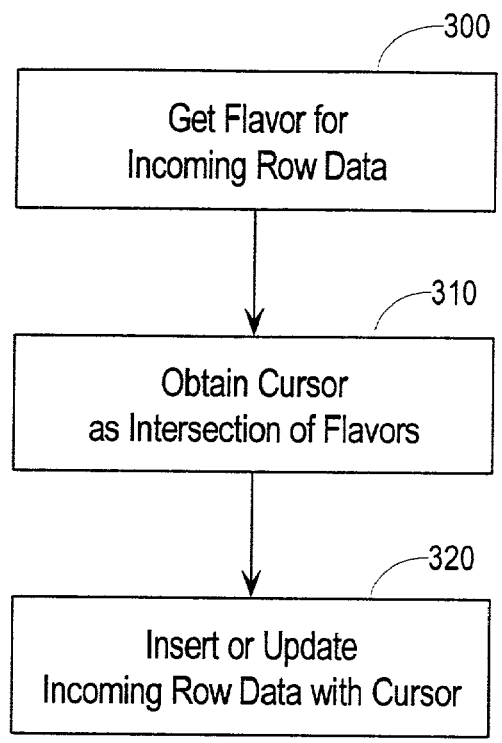
FIGS. 3(a) and 3(b) are flowcharts for supporting different flavors during replication.

When the propagated changes are received at the destination site 204, the destination site 204 interprets the changes based on the source flavor 232 and the destination flavor 234. FIG. 3(a) illustrates this operation an accordance with one embodiment. At step 300, the source flavor 232 is received along with the rows that were pushed to the destination site 204. Thus, the destination site 204 is able to identify which columns are held in common in the propagated changes by performing an intersection of the destination flavor 234 and the source flavor 232 to generate a cursor that implements that intersection when invoked to insert or update rows at the master tables (step 320).

Figure 3B:
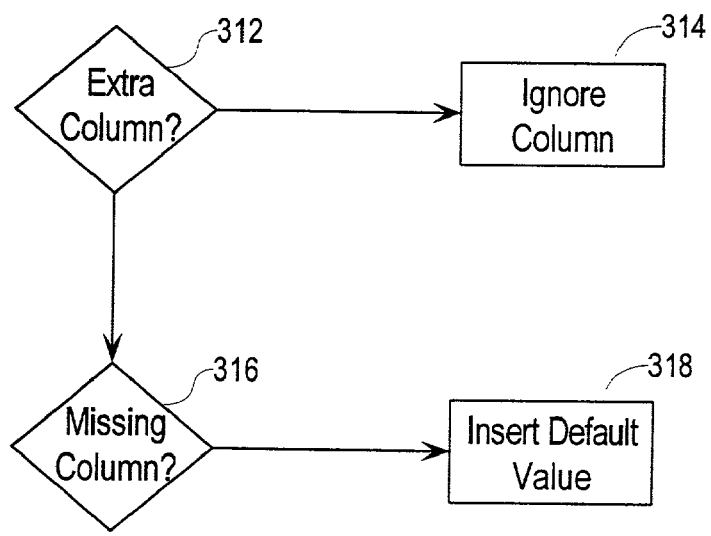

FIG. 3(b) illustrates the logic supported by the generated INSERT or UPDATE cursor. If the column in the pushed updates from the source site 202 is an extra column that is not found in the flavor 234 of the destination site 204, for example column A 222, (block 312), then the extra column is simply ignored (block 314). On the other hand, if the pushed update from the source site 202 fails to include a column that is present at the destination site 204, for example column B 224 (block 316), then the missing column is filled in with a default value (block 318).

Therefore, the use of flavors allows for changes to be propagated from a source site 202 to a destination site 204, without having to keep all the object groups at all the sites the same.

SCHEMA EVOLUTION WITH FLAVORS

In accordance with another aspect of the invention, flavors can help implement a phased roll-out of an upgraded database application, when the upgraded database application requires changes to its schema. A phased roll-out allows for a single site in a large distributed database system to be installed and stress tested until the bugs are worked out and the database application stabilizes, rather than subjecting every user in the distributed database system to the disruption caused by a single phase roll-out.

Figure 4A:
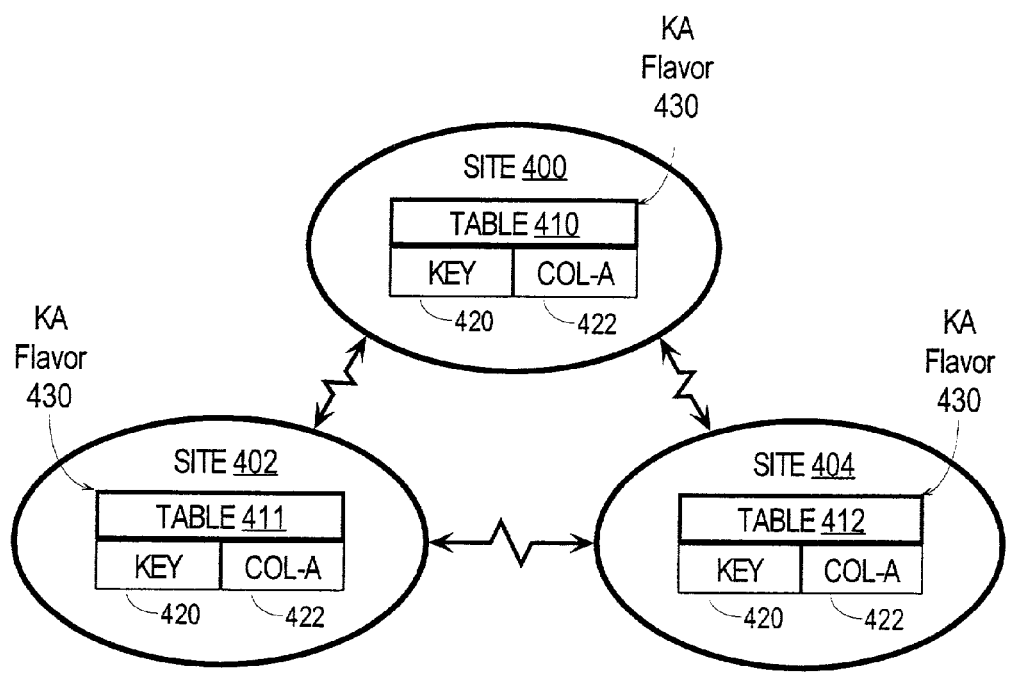
FIGS. 4(a), 4(b), 4(c), 4(d), and 4(e) are schematic drawings of a distributed database system during a process of schema evolution.

FIG. 4(a) illustrates a distributed database system in which an exemplary phased roll-out is to be carried. The distributed database system includes three sites, site 400 at a company's headquarters, site 402 at one of the sales offices, and site 404 at another sales office. Initially, the application schema includes a table 410 at the headquarters site 400 having a primary key 420 and a column A 422. The sales office sites 402 and 404 store respective tables 411 and 412 as replicas of table 410.

Suppose the developers of the database application wish to evolve the schema by adding a new column, B, to replicated table 410 and dropping the column A 422, but with little disruption to the entire distributed database system. Accordingly, the object group for the replicated tables 410, 411, and 412 is given a flavor KA 430 that states that the replicated tables 410, 411, and 412 has a primary key 420 column and column A 422.

Figure 4B:
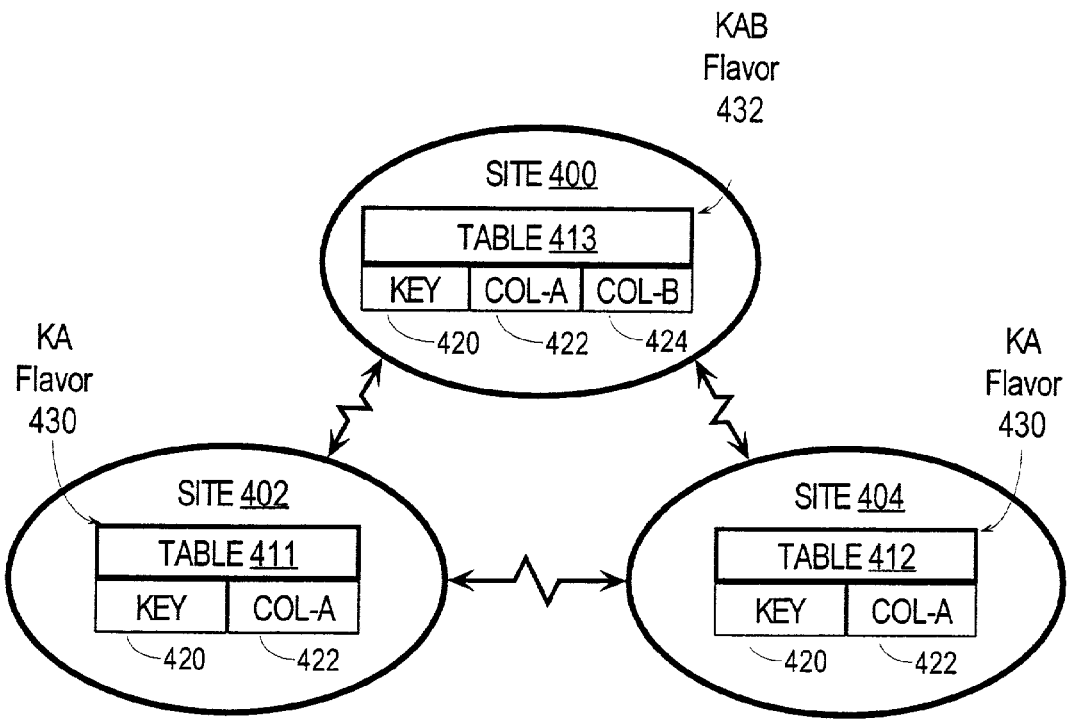
Figure 5:
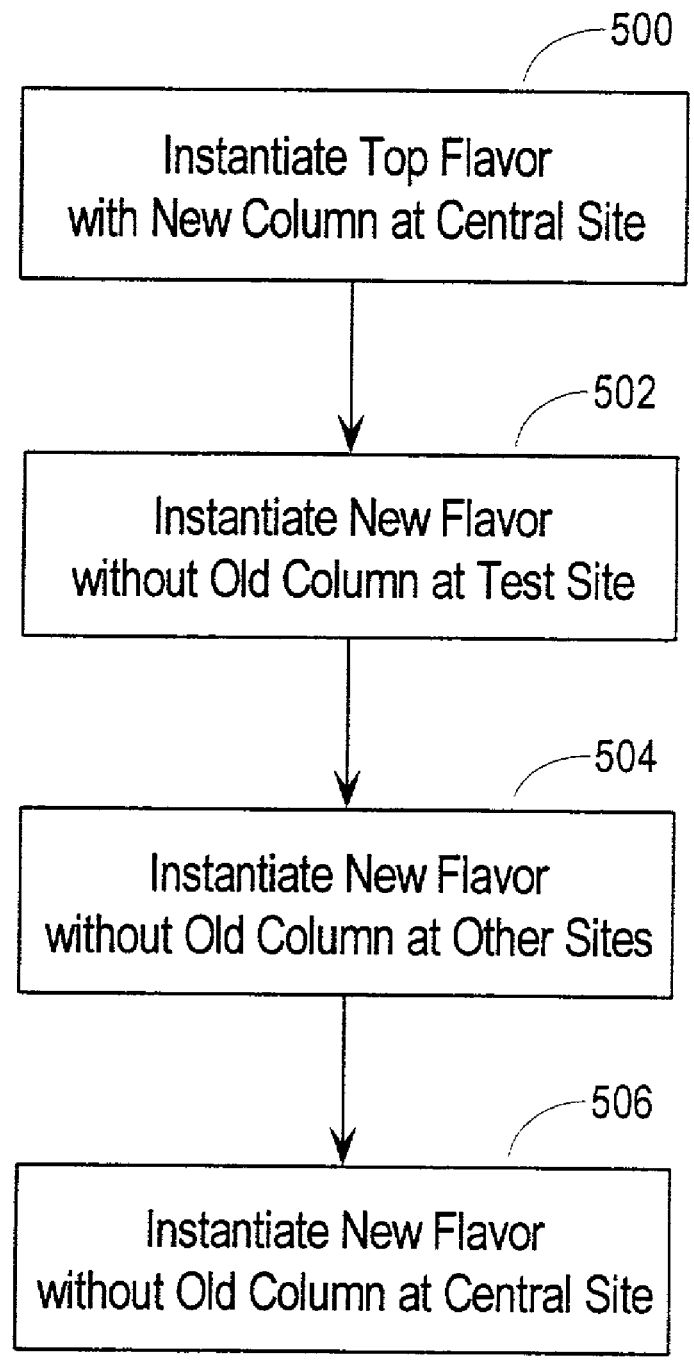
FIG. 5 is a flowchart for schema evolution.

FIG. 5 shows steps taken in the developers' phased roll-out. At step 500 and with concurrent reference to FIG. 4(b), the developers define a new top flavor KAB 432 at the headquarters site 400 that includes the new column B 424 as well as the obsolescent column A 422. Flavor KAB 432 is called the "top" flavor because it describes the fullest extent of the object group. The definition for the flavor KAB 432 is published to the other sales office sites 402 and 404, before instantiating the flavor KAB 432 at the headquarters site 400 so that the sales office sites 402 and 404 will know how to handle propagated changes coming from the headquarters site 400 in the new flavor KAB 432. Instantiating the flavor KAB 432 at the headquarters site 400 cause the new column 424 to be added to old table 410 to produce new table 413 with a different shape than previously.

Figure 4C:
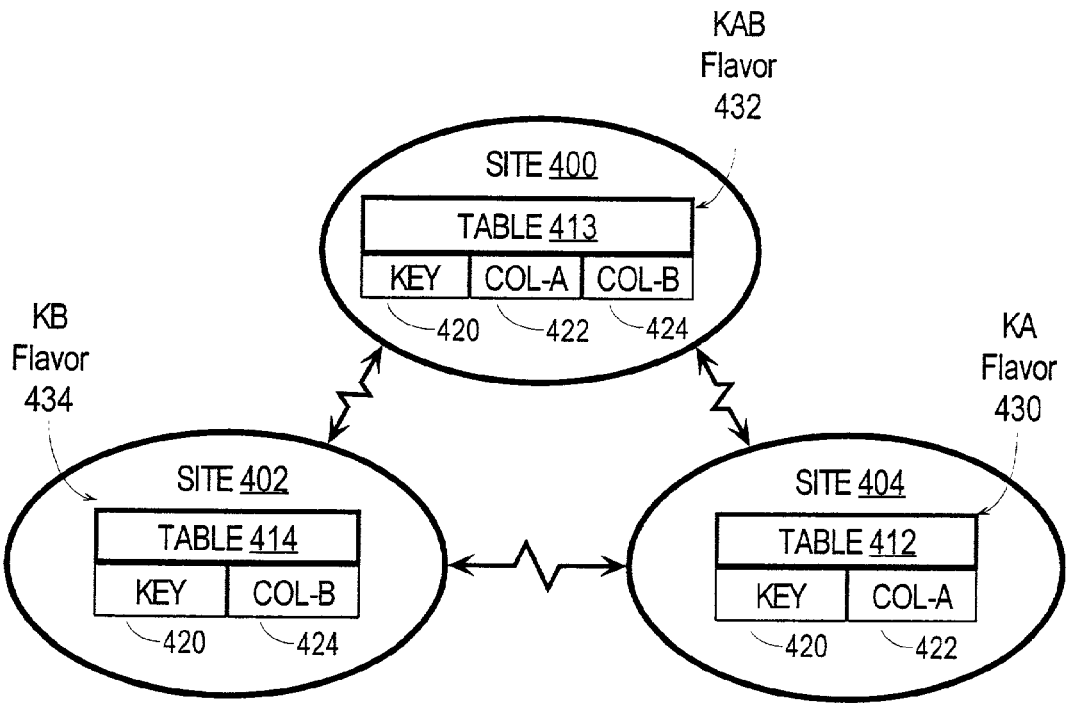

At step 502 with concurrent reference to FIG. 4(c), a new flavor KB 434 is defined as a subset of the top flavor KAB 432. Specifically, the new flavor KB 434 includes the primary key 420 and the new column B 424, but not the obsolescent column A 422. Before instantiating the flavor KB 434 at the test sales office site 402, the definition of the flavor KB 434 is published to the headquarters site 400 and the sales office site 404. Instantiating the flavor KB 434 at the sales office site 402, results in adding the new column B 424 and dropping the obsolescent column A 422 from table 411 to produce table 414 with a different shape.

Figure 4D:
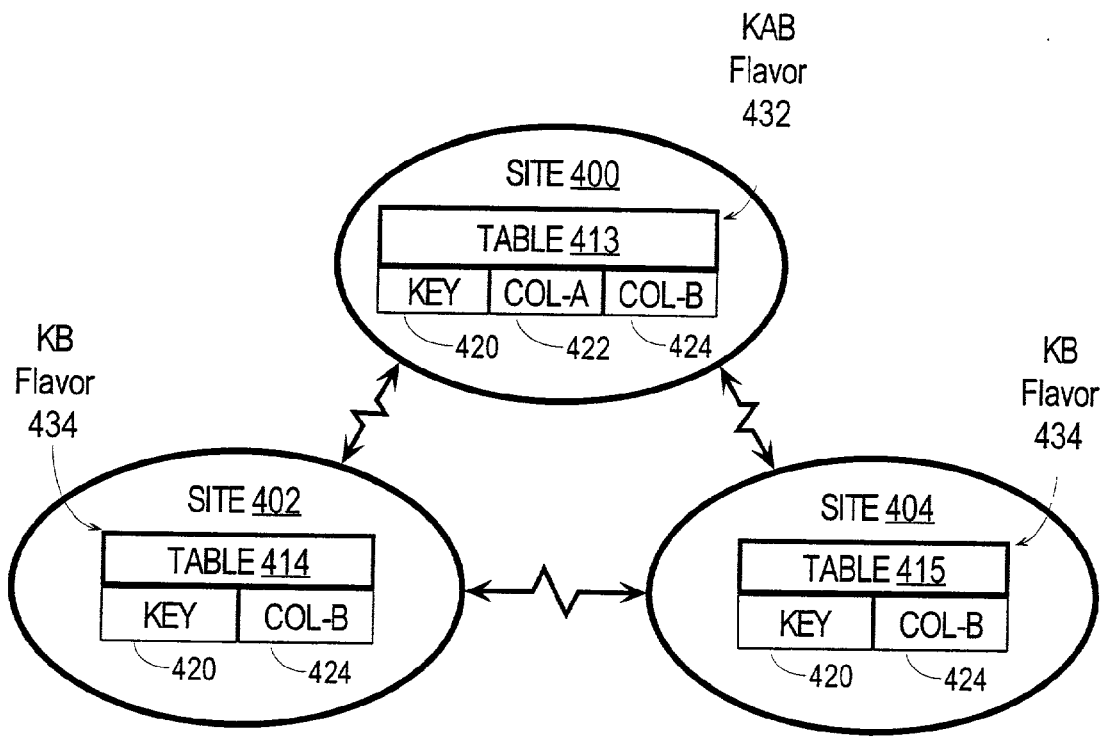

After stress testing the new database application at the test sales office site 402 and becoming satisfied with the stability of the new database application, the developers begin instantiating the new flavor KB 434 at the other sites (step 504). With reference to FIG. 4(d), the new flavor KB 434 is instantiated at the other sales office site 404 so that table 415 now has column B 424 rather than column A 422, in addition to the primary key 420 column.

Figure 4E:
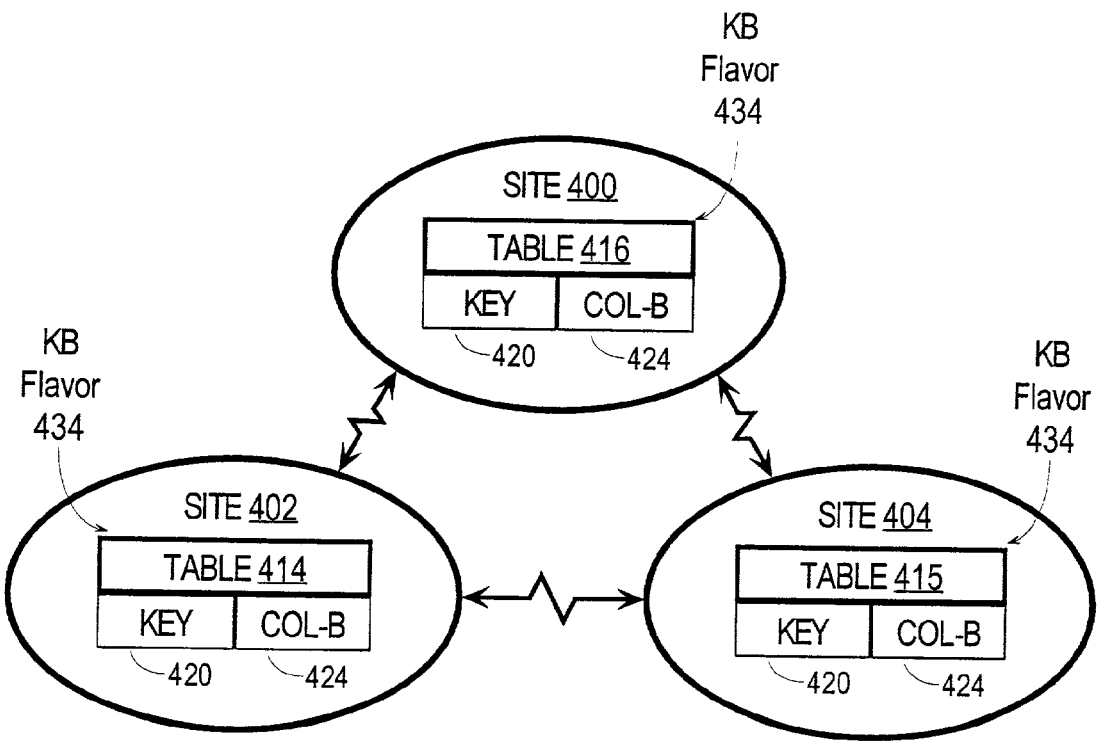

At step 506 and with concurrent reference to FIG. 4(e), the headquarters site 400 is instantiated with the new flavor KB 434, so that column A 422 is finally dropped from table 413 to produce table 416. Since step 506 means that column A 422 is dropped from all sites with the object group, the flavor KB 434 becomes the new top flavor.

UPDATABLE SNAPSHOT REPLICATION WITH FLAVORS

Figure 6:
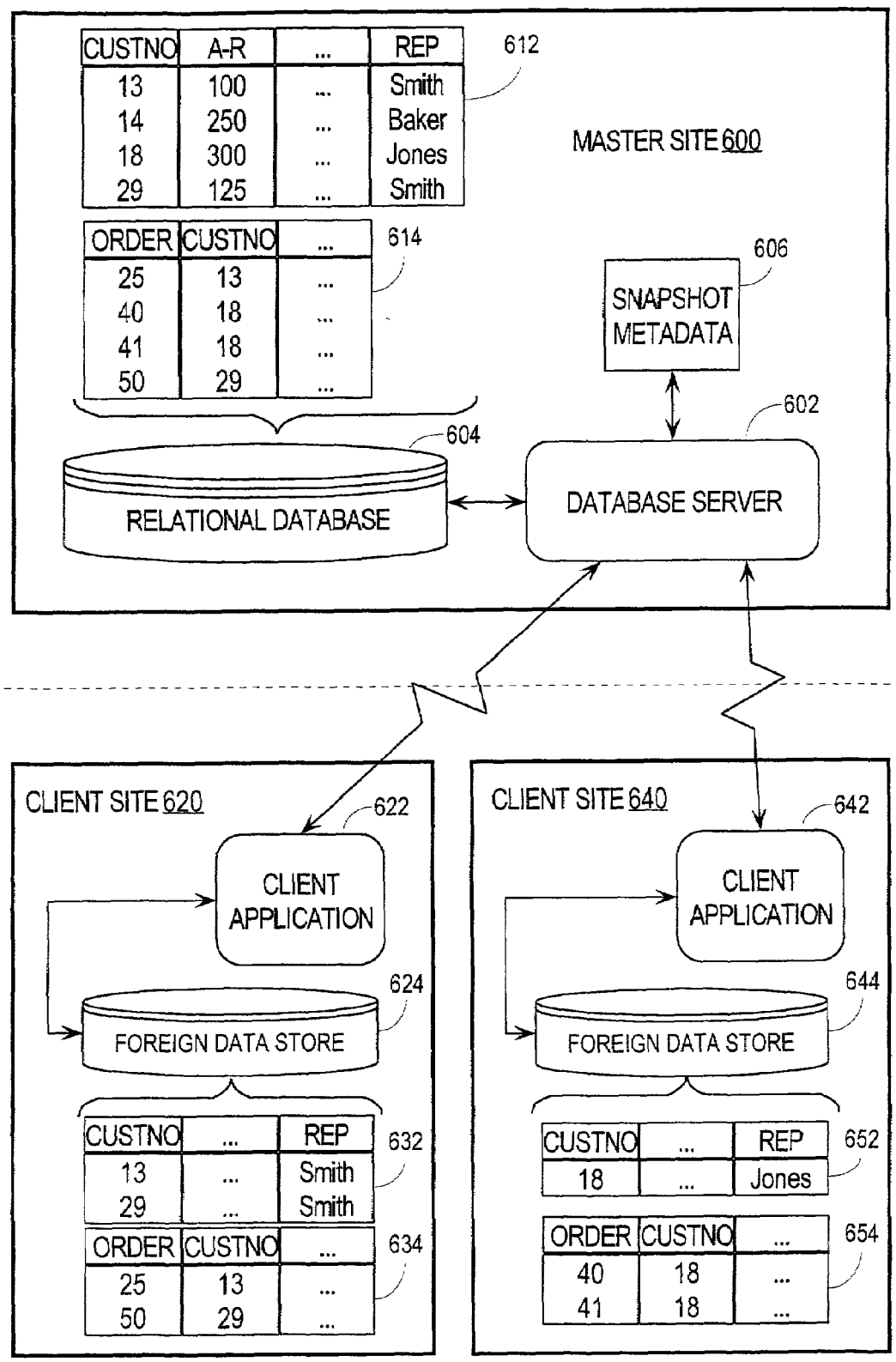
FIG. 6 is a schematic depiction of a snapshot replication environment in accordance with an embodiment.

In one embodiment, updatable snapshots use flavors to enable column-level subsetting of replicated data. For example, FIG. 6 depicts an exemplary snapshot replication environment for a company's sales department comprising a master site 600, client site 620, and client site 640. Master site 600, which may be a high-performance computer system at the company's headquarters, includes a relational database server 602 that is responsible for storing and retrieving data from a relational database 604. In this example, relational database 604 contains a customers master table 612 and an orders master table 614. The customers master table 612 is illustrative of the data stored in rows for each customer of the company and includes columns for the customer number CUSTNO, the amount of the accounts receivable A-R, and the sales representative REP to whom the customer is assigned. For example, customers 13 and 29 are assigned to sales representative Smith, and customer 18 is assigned to sales representative Jones. The orders master 614 illustrates the data stored in rows for each order that a customer makes and includes a column ORDER that indicates the number of the order and a CUSTNO column that is correlated to the customer in the customer masters table 612. For example, order 25 was placed by customer 13, and orders 40 and 41 were placed by customer 18.

In the illustrated embodiment, client site 620 and client site 640 are laptops that are temporarily connected to the master site 600 by a dial up line or the like, and belong to sales representatives Smith and Jones, respectively. In a front office automation environment, it is desirable for Smith to have a copy of Smith's customer information and a copy of the corresponding order information for those customers at Smith's laptop, i.e. client site 620, and for Jones to have a copy of Jones's customer and order information at Jones's laptop, i.e. client site 640. However, neither sales representative needs to have the accounts receivable information in customer master table 612.

Accordingly, client site 620 includes a front office client application 622, for example a thin application implemented in JAVA™, that manages a foreign data store 624 that contains snapshots of the customer master table 612 and the order master table 614 as customer snapshot 632 and order snapshot 634, respectively. Foreign data store 624 need not be a relational database and may be implemented by less sophisticated means. Since Smith is presumably only interested in Smith's own data, the customer snapshot 632 and order snapshot 634 only keep a subset of the data in the customer master table 612 and the order master table 614, respectively. Specifically, customer snapshot 632 contains the rows for Smith's customers and order snapshot 634 contains the corresponding order information. For example, customer snapshot 632 contains two rows for customers 13 and 29, and rows for orders 25 and 50 are kept in order snapshot 634.

Further, the client site 620 only keeps a snapshot of a column-level subset of the master tables. For example, customer snapshot 632 does not have the accounts received column of the customer master table 612. Thus, customer snapshot 632 belongs to a different flavor from that of the master site 600. Column-level subsetting reduces communication cost in replication because less data is transferred between the master site 600 and the client site 620. Generally, the column-level subset occurs at the granularity of the column group for conflict resolution correctness.

Similarly, client site 640 includes a front office client application 642, such as a thin application implemented in JAVA™, that manages a foreign data store 644 that containing snapshots of the customer master table 612 and the order master table 614 as customer snapshot 652 and order snapshot 635, respectively. Foreign data store 644 need not be a relational database and may be implemented by less sophisticated means. Since Jones is only properly interested in Jones's own data, the customer snapshot 652 and order snapshot 654 only keep a subset of the data in the customer master table 612 and the order master table 614, respectively. Specifically, the customer snapshot 652 contains a row for Jones's customers (e.g. customer 18) and the order snapshot 654 contains the corresponding order information (e.g. orders 40 and 41). The information required to maintain and drive the refreshes for the local snapshots, such as the defining queries for the snapshots and the latest refresh times, however, is kept at the master site 600 in snapshot metadata 606, although client site 640 maintains some metadata identifying which snapshots are instantiated there, the refresh groups to which they belong, and the columns and column groups of each snapshot.

At some point after a refresh group of snapshots 632, 634 has been instantiated at a laptop client site 620, the sales representative will want to refresh the snapshots 632, 634 to bring them up to date. In addition, if the snapshots 632, 634 have been installed as updatable snapshots, the sales representative may have changes such as new customer orders to be uploaded to the master site 600. Accordingly, the sales representative would connect the laptop 620 to the master site 600, for example by a dial up telephone line or the like, and request to update the snapshots 632, 634 on the laptop 620.

If the local snapshots are updatable and updates have been indeed been made to the updatable snapshots, the queued updates are pushed to the master site 600 from the locally maintained update snapshot logs. As described with reference to FIGS. 3(a) and 3(b), the master database server 602 handles the differences between flavors by ignoring extra columns or filling in missing columns with default values as the case may be.

UPWARD COMPATIBILITY

The term upward compatibility refers to the ability for an earlier version of an application to coexist peacefully with a later version of the application. For example, one version of a front office automation application purchased from a vendor may be installed in a distributed database system with a sales force using laptops, with the above-described mass deployment and off-line instantiation techniques. When the vendor upgrades the front office automation application by adding features and when the sales force purchases the upgrade, it becomes necessary to coordinate the changes introduced by the new version of the front office automation application, especially when one of the columns in the master table has been added or deleted.

Since a laptop remains disconnected from the master site 600 for a considerable length of time, it is possible for a sales representative to make changes to the laptop's updatable snapshots in a version of the front office automation application that is older than one installed at the master site 600. For example, one of the columns in the master table, such as the accounts receivable A-R column, could have been added. The queued changes, therefore, would not refer to a column that exists in the master table.

With flavors, however, the queues can still be pushed because the master site 600 handles the missing columns. Therefore, the use of flavors allows for updates to updatable snapshots to be propagated from the client site 620 to the master site 600, without having to coordinate first a connection of all the client sites 620, 640, etc. to the master site 600 for upgrading of the client sites 620, 640, etc.

While this invention has been described in connection with what is presently considered to be the most practical and preferred embodiment, it is to be understood that the invention is not limited to the disclosed embodiment, but on the contrary, is intended to cover various modifications and equivalent arrangements included within the spirit and scope of the appended claims.

What is claimed is:

1. A method of propagating changes to a table, comprising:
   maintaining a second version of the table at a second site;
   receiving, at the second site, from a first site maintaining a first version of the table, change data that identifies changes made to the first version of the table; and
   updating, at the second site, the second version of the table based on the change data to create an updated second version of the table,
   wherein at least one of the first version of the table and the updated second version of the table have at least one non-overlapping relational database column both before and after the step of updating.

2. The method of claim 1, wherein the non-overlapping relational database column is present in the first version and missing in the updated second version.

3. The method of claim 1, wherein the non-overlapping relational database column is missing in the first version and present in the updated second version.

4. The method of claim 1, further comprising the step of reconciling differences in the column shape of the first version and the column shape of the second version for changes identified in the change data.

5. The method of claim 1, further comprising the step of defining a top flavor describing overlapping relational database columns and non-overlapping relational database columns of the table.

6. The method of claim 5, further comprising the steps of:
   defining a first flavor describing the columns of the first version; and
   receiving, at the second site, from the first site, an indicator of the first flavor.

7. The method of claim 5, further comprising the steps of:
   defining a second flavor describing the columns of the second version; and
   wherein the step of updating, at the second site, the second version of the table based on the change data includes the step of updating overlapping columns between the first flavor and the second flavor in the second version of the table.

8. The method of claim 1, further comprising:
   maintaining an updatable snapshot at a laptop computer site, wherein
   the step of maintaining the second version of the table at the second site includes the step of maintaining a master table at a master site.

9. A method of modifying a table to drop a first column and add a second column, said table being replicated at a plurality of sites, comprising the steps of:
   (a) associating a first flavor with a first site, said first flavor describing the table as having both the first column and the second column;
   (b) after associating the first flavor with the first site, adding the second column to a first version of the table at the first site, so that the first version of the table contains both the first column and the second column;
   (c) associating a second flavor with the second site, said second flavor describing the table as having the second column but not the first column;
   (d) after associating the second flavor with the second site, dropping the first column and adding the second column to a second version of the table at the second site;
   (e) after dropping the column and adding the second column to the second version of the table at the second site, associating the second flavor with the first site and dropping the first column from the first version of the table at the first site; and
   (f) maintaining replication activities while performing steps (a), (b), (c), (d), and (e) such that records stored in the first version of the table at said first site are replicated from said first site to said second site while said first version of the table and said second version of the table maintain a different set of columns for the table.

10. The method of claim 9, wherein the step of maintaining replication activities includes the steps of:
    transmitting change data that identifies changes made to the first version of the table from the first site to the second site; and
    updating the second version of the table at the second site based on overlapping columns between the first flavor and the second flavor.

11. A method of propagating changes to a data container, comprising:
    maintaining a second version of the data container at a second site;
    receiving, at the second site, from a first site maintaining a first version of the data container, change data that identifies changes made to the first version of the data container; and
    updating, at the second site, the second version of the data container based on the change data to create an updated second copy of the table;
    wherein the first copy of the data container and the updated second copy of the data container have at least one non-overlapping data field both before and after the step of updating.

12. A tangible computer-readable storage medium storing one or more sequences of instructions for propagating changes to a table, wherein execution of the one or more sequences of instructions by one or more processors causes:
    maintaining a second version of the table at a second site;
    receiving, at the second site, from a first site maintaining a first version of the table, change data that identifies changes made to the first version of the table; and
    updating, at the second site, the second version of the table based on the change data to create an updated second version of the table,
    wherein at least one of the first version of the table and the updated second version of the table have at least one non-overlapping relational database column both before and after the step of updating.

13. The tangible computer-readable storage medium of claim 12, wherein the non-overlapping relational database column is present in the first version and missing in the updated second version.

14. The tangible computer-readable storage medium of claim 12, wherein the non-overlapping relational database column is missing in the first version and present in the updated second version.

15. The tangible computer-readable storage medium of claim 12, further comprising the step of reconciling differences in the column shape of the first version and the column shape of the second version for changes identified in the change data.

16. The tangible computer-readable storage medium of claim 12, further comprising the step of defining a top flavor describing overlapping relational database columns and non-overlapping relational database columns of the table.

17. The tangible computer-readable storage medium of claim 16, further comprising the steps of:
defining a first flavor describing the columns of the first version; and
receiving, at the second site, from the first site, an indicator of the first flavor.

18. The tangible computer-readable storage medium of claim 16, further comprising the steps of:
defining a second flavor describing the columns of the second version; and
wherein the step of updating, at the second site, the second version of the table based on the change data includes the step of updating overlapping columns between the first flavor and the second flavor in the second version of the table.

19. The tangible computer-readable storage medium of claim 12, wherein execution of the one or more sequences of instructions further causes:
maintaining an updatable snapshot at a laptop computer site, wherein
the step of maintaining the second version of the table at the second site includes the step of maintaining a master table at a master site.

20. A tangible computer-readable storage medium storing one or more sequences of instructions for modifying a table to drop a first column and add a second column, said table being replicated at a plurality of sites, wherein execution of the one or more sequences of instructions by one or more processors causes:
(a) associating a first flavor with a first site, said first flavor describing the table as having both the first column and the second column;
(b) after associating the first flavor with the first site, adding the second column to a first copy of the table at the first site, so that the first version of the table contains both the first column and the second column;
(c) associating a second flavor with the second site, said second flavor describing the table as having the second column but not the first column;
(d) after associating the second flavor with the second site, dropping the first column and adding the second column to a second version of the table at the second site;
(e) after dropping the column and adding the second column to the second version of the table at the second site, associating the second flavor with the first site and dropping the first column from the first version of the table at the first site; and
(f) maintaining replication activities while performing steps (a), (b), (c), (d), and (e) such that records stored in the first version of the table at said first site are replicated from said first site to said second site while said first version of the table and said second version of the table maintain a different set of columns for the table.

21. The tangible computer-readable storage medium of claim 20, wherein the step of maintaining replication activities includes the steps of:
transmitting change data that identifies changes made to the first version of the table from the first site to the second site; and
updating the second version of the table at the second site based on overlapping columns between the first flavor and the second flavor.

22. A tangible computer-readable storage medium storing one or more sequences of instructions for propagating changes to a data container, wherein execution of the one or more sequences of instructions by one or more processors causes:
maintaining a second version of the data container at a second site;
receiving, at the second site, from a first site maintaining a first version of the data container, change data that identifies changes made to the first version of the data container; and
updating, at the second site, the second version of the data container based on the change data to create an updated second copy of the table;
wherein the first version of the data container and the updated second version of the data container have at least one non-overlapping data field both before and after the step of updating.

* * * * *